United States Patent
Soon-Shiong et al.

(10) Patent No.: US 12,104,263 B2
(45) Date of Patent: Oct. 1, 2024

(54) METHODS AND SYSTEMS FOR PRODUCING CARBON-NEUTRAL FUELS FROM ARAGONITE

(71) Applicants: Nant Holdings IP, LLC, Culver City, CA (US); Calcean Minerals and Materials, LLC, Gadsden, AL (US)

(72) Inventors: Patrick Soon-Shiong, Culver City, CA (US); Anthony Myers, Gadsden, AL (US)

(73) Assignees: Nant Holdings IP, LLC, Culver City, CA (US); Calcean Minerals and Materials, LLC, Gadsden, AL (US)

( * ) Notice: Subject to any disclaimer, the term of this patent is extended or adjusted under 35 U.S.C. 154(b) by 0 days.

(21) Appl. No.: 18/446,803

(22) Filed: Aug. 9, 2023

(65) Prior Publication Data
US 2024/0035170 A1    Feb. 1, 2024

Related U.S. Application Data

(62) Division of application No. 18/296,023, filed on Apr. 5, 2023, now Pat. No. 11,761,098, which is a division of application No. 17/873,995, filed on Jul. 26, 2022, now Pat. No. 11,649,550.

(51) Int. Cl.
| | |
|---|---|
| *C25B 3/26* | (2021.01) |
| *C01B 32/50* | (2017.01) |
| *C01F 11/04* | (2006.01) |
| *C25B 1/23* | (2021.01) |

(52) U.S. Cl.
CPC ............... *C25B 3/26* (2021.01); *C01B 32/50* (2017.08); *C01F 11/04* (2013.01); *C25B 1/23* (2021.01); *C01B 2203/0272* (2013.01)

(58) Field of Classification Search
CPC .. C25B 3/26; C25B 1/23; C01B 32/50; C01B 32/186; C01F 11/04; C01F 11/06; F24S 20/30; C04B 2/04; C07C 1/02; C07C 29/195
See application file for complete search history.

(56) References Cited

U.S. PATENT DOCUMENTS

| | | | | |
|---|---|---|---|---|
| 4,054,464 A | * | 10/1977 | Thorn, Jr. | ......... C04B 7/38 106/770 |
| 2006/0039853 A1 | * | 2/2006 | Fan | ......... B01J 20/043 423/637 |

FOREIGN PATENT DOCUMENTS

CN    111023588 B  *  4/2021  .......... F24S 20/40

OTHER PUBLICATIONS

CN 111023588B_English (Year: 2021).*
Umeda et al. (Electrochemical Reduction of CO2 to Methane on Platinum Catalysts without Overpotentials: Strategies for Improving Conversion Efficiency, 2020, Appl. Energy Mater. 3, 1119-1127) (Year: 2020).*

* cited by examiner

*Primary Examiner* — Youngsul Jeong
(74) *Attorney, Agent, or Firm* — Martin Fessenmaier; Umberg Zipser LLP

(57) ABSTRACT

Carbon-neutral fuels are produced from aragonite in a solar thermal decomposition process in which the carbon dioxide generated from the aragonite is catalytically converted to methane, ethanol, or Fischer-Tropsch liquids. Advantageously, heat from the aragonite production can be recovered and used in downstream processes to thereby minimize the carbon footprint of the fuel production.

19 Claims, No Drawings

METHODS AND SYSTEMS FOR PRODUCING CARBON-NEUTRAL FUELS FROM ARAGONITE

This application is a divisional application of our allowed US application with the Ser. No. 18/296,023, which was filed Apr. 5, 2023, which claims priority to U.S. Pat. No. 11,649,550, which was filed Jul. 26, 2022, each of which are incorporated by reference herein.

FIELD OF THE INVENTION

The field of the invention is systems and methods of producing carbon-neutral fuels from aragonite, and especially as it relates to catalytic methane and ethanol production from carbon dioxide ($CO_2$) obtained by solar and/or thermal decomposition of aragonite.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Despite numerous efforts to curb greenhouse gas emissions, reliance on fossil fuels to generate energy and to provide transportation fuel remains a significant issue. To alleviate at least some of the issues associated with fossil fuels, various biofuels have been developed that can be produced from regenerative sources such as switch grass, grains, or corn. Most typically, such plant materials are processed and fermented to provide ethanol that can then be blended with refined fuels (e.g., E85 flex fuel containing between about 50 to 85% ethanol, California Summer fuel blend containing 10-15% ethanol). Unfortunately, the production of ethanol from plants is energy intensive and as such generates its own greenhouse emissions. Similarly, plant oils commonly used in the food industry can be converted to biodiesel in a relatively simple transesterification process that produces fatty acid methyl esters (biodiesel) and glycerin. While biodiesel can be made in a simple process, the resulting fuel is limited to diesel engines. Moreover, proper disposal of side products and equipment cost are often prohibitive for larger scale implementation, and running such process is once more energy demanding.

In yet other known methods as described in WO 2005/001977 carbonaceous materials are gasified to produce syngas, of which a portion is electrochemically oxidized in a fuel cell to produce water and electrical energy, while another portion of the syngas is converted to Fischer-Tropsch liquids. Notably, while such process does not produce significant quantities of greenhouse gas emissions and is conceptually relatively simple, the process still requires high temperatures for gasification and will therefore demand significant energy that is not satisfied by the power production of the fuel cell.

Thus, even though various systems and methods of fuel production from regenerative resources are known in the art, all or almost all of them suffer from several drawbacks. Most notably, while such systems and methods avoid fossil fuels, processing of these regenerative resources is once more energy intensive and therefore has a significant carbon footprint. Therefore, there remains a need for improved fuel production from regenerative resources.

SUMMARY OF THE INVENTION

The inventive subject matter is directed to various systems and methods of producing carbon-neutral fuels from aragonite, and especially to catalytic production of methane, ethanol, or Fischer-Tropsch liquids from carbon dioxide that is obtained by solar and/or thermal decomposition of aragonite. Advantageously, heat from the aragonite production can be recovered and used in downstream processes to thereby minimize the carbon footprint of so produced fuels.

In one aspect of the inventive subject matter, the inventors contemplate a method of producing a fuel that includes a step of thermally decomposing aragonite to produce calcium oxide solids and carbon dioxide gas, wherein the step of thermal decomposition uses solar radiation and/or a heat transfer medium that was previously heated by solar radiation. In another step, thermal energy from the calcium oxide solids and/or the carbon dioxide gas is used to supply energy to a chemical reaction in which the carbon dioxide is reduced to the fuel and/or in which hydrogen is generated.

In some embodiments, the aragonite is oolitic aragonite having an average particle size of between 1-100 μm, and/or the thermal decomposition is performed at a temperature of at least 500° C. In further embodiments, the aragonite may be preheated prior to thermal decomposition, for example, by using heat from the heat transfer medium and/or thermal energy extracted from the calcium oxide solids and/or the carbon dioxide gas. Most typically, the step of thermal decomposition uses solar radiation collected from a plurality of heliostats, and where desired, at least some of the heliostats may be used to preferentially heat a first portion of the aragonite in a receiver relative to a second portion of the aragonite in the receiver.

As should also be appreciated, at least some of the heliostats may be used to heat a heat transfer medium (e.g., to generate a heat supply for a dark period and/or to provide heat to support a reduction reaction). For example, thermal energy from the calcium oxide solids and/or the carbon dioxide gas may be recovered by a heat exchange circuit, and the heat exchange circuit may be thermally coupled to a power generation unit that provides power to the chemical reaction. Alternatively, or additionally, the thermal energy from the carbon dioxide gas is used in the chemical reaction in which the carbon dioxide is reduced to the fuel.

In yet further embodiments, the chemical reaction may comprise a catalytic reduction of the carbon dioxide or may comprise an electrochemical catalytic reduction of the carbon dioxide. Therefore, it should be appreciated that the fuel produced by the processes according to the inventive subject matter may be methane, ethanol, or a Fischer-Tropsch liquid.

In another aspect of the inventive subject matter, the inventors also contemplate method of thermally decomposing a decomposable material, and such method may include a step of directing solar radiation reflected from a plurality of reflective surfaces to a receiver that contains a decomposable material. Most typically, the step of directing the solar radiation comprises positioning at least some of the reflective surfaces such that the reflected solar radiation preferentially heats a first portion of the decomposable material in the receiver relative to a second portion of the decomposable material and/or a heat transfer medium in the receiver. At least some of the decomposable material is then heated in the receiver to a temperature at which the decomposable material releases carbon dioxide.

For example, suitable decomposable materials include oolitic aragonite having an average particle size of between 1-100 µm, and in further examples, the plurality of reflective surfaces may be part of a plurality of respective heliostats. Therefore, in at least some embodiments, the step of directing the solar radiation produces a focal vertex or focal edge on the receiver. While numerous configurations for the receiver are deemed suitable, preferred configurations especially include fluidized bed reactor configurations.

In further contemplated aspects, the at least some of the reflective surfaces may be part of a heliostat array, or the at least some of the reflective surfaces may include at least one secondary reflective surface proximal to the receiver. Among other options, it is typically preferred that positioning the at least some of the reflective surfaces to preferentially heat the first portion of the decomposable material in the receiver is effected by a controller. For example, the controller may determine the positioning based on a distribution and/or a type of material in the receiver, and/or the controller may determine the size of the first portion based on a quantity of the released carbon dioxide. Most typically, the first portion of the decomposable material in the receiver will be adjacent to the second portion of the decomposable material in the receiver.

Therefore, the inventors also contemplate in a further aspect of the inventive subject matter as plant that comprises a plurality of reflective surfaces configured to receive and direct solar radiation to a receiver that contains a decomposable material. Most typically, the decomposable material releases has a composition effective to release carbon dioxide gas upon heating with the solar radiation and/or a heat transfer medium that was previously heated by solar radiation. A reactor is then coupled to the receiver and configured to receive the carbon dioxide gas and to reduce the carbon dioxide gas to a fuel.

As noted above, the plurality of reflective surfaces may be configured as heliostats, and/or the decomposable material comprises oolitic aragonite having an average particle size of between 1-100 µm. Where desired, the receiver may also be thermally coupled to a heat transfer medium circuit that stores heat in a molten salt liquid. It is further generally preferred that the plant comprises a separator that separates the carbon dioxide gas from the decomposable material, wherein the separator is fluidly coupled to the reactor to provide the carbon dioxide gas to the reactor. Moreover, the plant may also include a heat transfer circuit that provides heat from the heat transfer medium that was previously heated by solar radiation to the reactor, which will typically comprise a catalyst (e.g., to support a reduction reaction that produces from the carbon dioxide methane, ethanol, or a Fischer-Tropsch liquid).

Various objects, features, aspects, and advantages of the inventive subject matter will become more apparent from the following detailed description of preferred embodiments, along with the accompanying drawing figures in which like numerals represent like components.

DETAILED DESCRIPTION

The inventors have discovered various systems and methods of thermal decomposition of aragonite, and especially oolitic aragonite in which solar radiation is used as a heat source (directly or indirectly via a heat transfer medium) to generate carbon dioxide gas and calcium oxide solids. The so produced carbon dioxide is then catalytically converted to a fuel product such as methane, ethanol, or Fischer-Tropsch liquids in a process that takes advantage of the heat content in the calcium oxide solids and/or the carbon dioxide gas to thereby render the process even more economical. Moreover, it is contemplated that the systems and methods presented herein may also control the position and/or area of the solar radiation impinging on the aragonite to optimize the thermal decomposition in a receiver that is illuminated by the solar radiation.

For example, one contemplated system will comprise a plurality of heliostats that are computer controlled to reflect solar radiation onto a receiver, which is typically mounted on top of a tower or disposed in an underground location to which the collected light is redirected via one or more secondary mirrors. With respect to the number and configuration of heliostats it should be recognized that the number of heliostats will typically depend on the amount of energy needed or desired for thermal decomposition of a particular material. Therefore, a typical heliostat array will include at least 10, or at least 20, or at least 30, or at least 50, or at least 75, or at least 100 heliostats that are coordinately controlled to deliver the solar radiation to a receiver. Of course, it should be noted that while heliostats are generally preferred for the systems and methods presented herein, a number of alternative arrangements of reflective surfaces may also be used, including static mirrors (e.g., arranged into a parabolic dish), mirror arrays with multiple focal points, etc.

Regardless of the manner of concentrating solar radiation, it is generally contemplated that the receiver will include a section in which the decomposable material is decomposed, and optionally another section in which excess solar energy (relative to the energy demand for a desired degree of decomposition) can be captured. Among other options, molten salt heat exchange systems are particularly preferred as such systems can be charged with excess heat as well as with waste heat recovered from the reaction products. One exemplary molten salt system suitable for use herein is described in US 2020/0095122, incorporated by reference herein.

As will be readily appreciated, the particular configuration of the portion of the receiver in which the decomposable material is thermally decomposed may vary considerably, and the particular configuration will typically at least in part depend on the type and size of the decomposable material. However, it is particularly preferred that the receiver will have a shape that can receive the concentrated solar radiation such that the heat can be effectively transferred to the decomposable material. Therefore, suitable receivers may be configured as an hourglass shaped receiver, a fluidized bed receiver, a flatbed receiver, etc. In this context, it should be appreciated that the receiver will not only be suitable for decomposition of various carbonates but will also be suitable for pyrolysis of various carbonaceous materials. Moreover, with respect to the material of the receiver it should be appreciated that the material will typically be a refractory material or contain a transparent portion (e.g., quartz glass) that allows for efficient heat transfer to the decomposable material. In addition, it should be appreciated that the receiver may also comprise a portion in which the decomposable material can be heated by a heat transfer medium that was previously heated by solar radiation. Therefore, the receiver may comprise a portion that will receive heat externally (via solar radiation) and/or internally (via a heat transfer fluid heated by solar radiation).

For example, and in one particularly preferred aspect, the decomposable material is oolitic aragonite as described in more detail below. Upon heating the aragonite to a temperature of 500-950° C., the aragonite will decompose into hot calcium oxide solids and hot carbon dioxide gas. Beneficially, the hot carbon dioxide gas will rise in the receiver while the hot calcium oxide solids will descend and separate from the carbon dioxide gas. In this context it should be particularly noted that both the solids and the gas contain appreciable quantities of heat energy that can be captured using a heat exchange system well known in the art. Preferably, the heat exchange system will have a working fluid that can then be used to drive a turbine (e.g., steam turbine, expansion turbine, etc.) to generate electrical or mechanical energy. Alternatively, or additionally, the heat exchange system may also be used to preheat the decomposable material and as such allow for significantly higher thermal efficiency.

On the other hand, and especially where the hot carbon dioxide is subjected to a catalytic reduction process at elevated temperatures, the heat content of the freshly generated carbon dioxide can be used to satisfy or support the heat requirements of the catalytic reduction. As will be readily appreciated, any excess heat collected in the receiver may also be used to satisfy or support the heat requirements of the catalytic reduction. In addition, and particularly where the catalytic reduction of carbon dioxide uses hydrogen as a reagent, it should be appreciated that the hydrogen can be generated by water or steam electrolysis using electricity generated from the working fluid of a heat recovery cycle that is thermally coupled to the received and that receives excess solar radiation and/or waste heat contained in the decomposition products. Alternatively, the hydrogen production may also be directly integrated into the receiver or thermally coupled heat exchange circuit via solar thermochemical water splitting (e.g., using a "direct" two-step cerium oxide thermal cycle or a "hybrid" copper chloride cycle). See also e.g., PNAS (2017) 114(51), 13385-13393.

In addition to the heat integration as described above, it should be appreciated that the systems and methods presented herein may also be optimized by 'beam steering' in which the heliostats and/or secondary reflective elements are moved in a controlled manner such that the focal vertex or edge can be preferentially directed to a specific portion of the receiver to thereby ensure a desired degree of thermal decomposition or a shift in heat transfer from the decomposable material to a heat transfer medium. To that end, a controller may be programmed to use sensor information from the receiver that indicates the degree of decomposition (e.g., by determination of released carbon dioxide) at a particular location, the distribution of the decomposable material, and/or the type of decomposable material to direct the solar radiation to a specific portion of the receiver. Thus, the focal vertex or edge can be directed to various (typically adjacent) portions on the receiver. It should be appreciated that such beam steering is particularly valuable where the solar portion of the system is in start-up or shut down mode at the beginning or end of the daylight period.

Most typically, but not necessarily, the reactor for the conversion of the carbon dioxide of the fuel product will be fluidly coupled to the receiver, and in some cases even be integrated into the same housing (e.g., where catalytic conversion is performed at elevated temperatures). On the other hand, the reactor may also be remote from the receiver (e.g., where the catalytic conversion is an electrochemical conversion performed in liquid phase). Regardless of the location of the reactor relative to the receiver, it should be appreciated that in contemplated systems and methods heat content in the reaction products and excess solar radiation that would be otherwise lost can be beneficially used in various associated process steps, such as preheating the decomposable product, generation of electrical energy for electrocatalytic conversion, thermal and/or electrical hydrogen production, and thermal energy demand for the reduction reactions in which the carbon dioxide is converted to a fuel.

With respect to suitable materials for the systems and methods presented herein it is contemplated that all thermally decomposable materials are deemed appropriate for use herein so long as such materials will produce appreciable quantities of carbon dioxide in a flameless decomposition process. Therefore, all materials suitable for pyrolysis that can generate carbon dioxide are deemed suitable for use herein. However, in preferred aspects of the inventive subject matter, the decomposable materials will include various carbonates, and particularly calcium carbonate. Among other choices, particularly preferred calcium carbonates include oolitic aragonite, which may or may not be further processed to obtain a particular size or size distribution or chemical composition.

For example, where the starting material is oolitic aragonite, the aragonite may be subjected to milling (e.g., ball milling) to produce a specific size and size distribution as is described in U.S. Patent Publication No. 2020/0308015, incorporated by reference herein. Therefore, contemplated oolitic aragonite may be ground particles having an average particle size of between 1-500 µm, such as between 1-10 µm, or between 10-50 µm, or between 25-75 µm, or between 50-200 µm, or between 10-300 µm, or between 100-500 µm. Therefore, suitable particles may have a diameter of greater than or equal to about 1µm, greater than or equal to about 5µm, greater than or equal to about 10 µm, greater than or equal to about 25 µm, greater than or equal to about 50 µm, greater than or equal to about 100 µm, greater than or equal to about 250 µm, greater than or equal to about 400 µm, but typically equal or less than about 1,000 µm, or equal or less than about 500 µm, or equal or less than about 400 µm, or equal or less than about 300 µm, or equal or less than about 200 µm, or equal or less than about 100 µm, or equal or less than about 50 µm. With respect to the size distribution of contemplated decomposable materials it is generally preferred that the size distribution is relatively homogenous to ensure proper flow of the solid materials through the devices and systems described herein. Therefore, it is typically preferred that the particle size distribution is such that at least 70%, or at least 80%, or at least 90%, or at least 95% of all particles fall within a single log unit.

Additionally, or alternatively, it is contemplated that the decomposable materials may also include various carbonaceous materials (and particularly carbonaceous materials from plants or human or animal waste) that are typically at least partially dehydrated and comminuted to provide a specific size or size distribution. Moreover, it is further contemplated that such materials will typically be thermally decomposed in an oxygen-controlled atmosphere (e.g., less than 20% $O_2$, or less than 15% $O_2$, or less than 10% $O_2$, or less than 5% $O_2$) to ensure pyrolytic conditions that can then produce a liquid product that can be refined to a fuel and carbon dioxide.

Therefore, it should be appreciated that the decomposition temperature will typically vary and will at least in part depend on the particular type of material used. For example, and with respect to oolitic aragonite it is contemplated that the thermal decomposition of the oolitic aragonite may be performed at a temperature of greater than or equal to about 500° C., greater than or equal to about 550° C., greater than or equal to about 600° C., greater than or equal to about 650° C., greater than or equal to about 700° C., greater than or equal to about 750° C., greater than or equal to about 800° C., greater than or equal to about 825° C., greater than or equal to about 850° C., greater than or equal to about 875° C., greater than or equal to about 900° C., greater than or equal to about 925° C., greater than or equal to about 950° C., greater than or equal to about 975° C., or greater than or equal to about 1000° C. Therefore, and viewed from a different perspective, thermal decomposition of the oolitic aragonite may be performed at a temperature from about 500° C. to about 1000° C., or from about 500° C. to about 975° C., or from about 500° C. to about 950° C., or from about 500° C. to about 900° C., or from about 500° C. to about 825° C., or from about 825° C. to about 900° C.

It should still further be appreciated that while the energy demand for the thermal decomposition is preferably supplied by solar radiation and/or a heat transfer medium that was previously heated by solar radiation, various alternative and/or additional sources of heat are also deemed suitable for use herein. Most preferably, the alternative and/or additional sources of heat will be waste heat from processes that are co-located with the fuel generation (e.g., within a distance of less than one mile) and as such include waste heat from combustion processes, waste heat from power generation, waste heat from exothermic heat of a chemical reaction or reaction sequence, waste heat from drying operations, waste heat from refining operations, etc. In still other embodiments, the waste heat may also be from a more remote location (e.g., within a distance of less than one mile) and may be provided by pipeline or other transport of a heat exchange or storage medium (e.g., molten salt medium). For example, where the fuel production facility is co-located with an industrial sulfuric acid production plant, exothermic heat released from the $SO_2/SO_3$ absorption into an aqueous medium can be used to supplement the energy demand of the thermal decomposition and/or the reaction processes that form the fuel. As should also be readily appreciated, such additional heat may be used directly, or converted to electrical energy.

Furthermore, and using the example of a co-located sulfuric acid production plant above, it should also be recognized that the sulfuric acid production plant may also supply sulfuric acid to the fuel production plant to generate secondary value products. For example, sulfuric acid may be reacted with aragonite to produce calcium sulfate/gypsum ($CaSO_4$) and $H_2CO_3$, which may then further decompose to $H_2O$ and $CO_2$, thereby producing additional quantities of non-thermally generated $CO_2$. Alternatively, or additionally, it should be appreciated that the thermal decomposition product calcium oxide may also be reacted with sulfuric acid to once more produce calcium sulfate/gypsum and water, however, without generation of $CO_2$. Similarly, hydrated quicklime ($Ca(OH)_2$) may react with sulfuric acid to generate calcium sulfate/gypsum and water. Alternatively, it should be appreciated that hydrated quicklime can be used as an effective absorbent for $CO_2$, which may be used to decarbonize combustion effluents from co-located plants (such as from a sulfuric acid production plant). In any of these exothermic reactions, the waste heat may be used to supply thermal energy to the decomposition process and/or for generation of electrical energy.

As will be readily appreciated, the residence time of the decomposable material at an elevated temperature will at least in part depend on the particular configuration of the receiver, the material thickness and type of the decomposable material, and/or the manner of heat transfer to the thermally decomposable material. However, the person of ordinary skill in eth art will be readily apprised of various manners of determination of carbon dioxide formation and concentrations (e.g., IR spectroscopy), and all of such methods are deemed suitable for use herein.

Regardless of the type of decomposable material, it should be appreciated that the carbon dioxide generated by thermal decomposition can then be converted into a fuel or other value product using one or more reduction reactions to so arrive at a hydrocarbon or alcohol using chemical synthetic reactions that are well known in the art. Among other choices, such reactions will typically make use of a catalytic system that reduces the activation energy, and the catalytic system may be a redox-type system or an electrocatalytic system as noted in more detail below. Moreover, it should be appreciated that where the reduction requires molecular hydrogen ($H_2$) as a reactant, the hydrogen can be readily prepared by an electrolytic process at elevated temperatures. In that context, it should be recognized that both thermal energy and electrical energy can be readily provided from the waste heat that can be harvested within the system as already discussed above.

With respect to methane production, it is generally contemplated that all known transformations of carbon dioxide to methane are deemed suitable for use herein so long as the carbon dioxide is at least partially provided by the thermal decomposition of the aragonite or other decomposable material. Thus, suitable methane production schemes may include one or more metal catalysts, or an electrochemical catalytic reaction. As will be readily appreciated, such reactions may be performed at elevated temperatures in the gas phase (which may advantageously use heat content of the carbon dioxide from the decomposition reaction) or in water in the liquid phase.

For example, methane can be produced from hydrogen and carbon dioxide using a ruthenium-based catalyst at temperatures of 300 to 400° C., or hydrogenation of carbon dioxide to methane may proceed over a $Ru/CeO_2$ catalyst in an electric field even at temperatures well below 300-400° C. (see e.g., *Chemistry Letters,* 2020; 49 (3): 303 DOI: 10.1246/cl.190930). Alternatively, methane can be produced in a multi-step reaction in which carbon dioxide is first reduced on a platinum surface to carbon monoxide, and the adsorbed CO is then selectively reduced to methane on carbon-supported platinum catalysts at low carbon dioxide partial pressures and at potentials close to the thermodynamic equilibrium potential of the reaction (0.16 V vs reversible hydrogen electrode), i.e., without overpotentials (see e.g., *ACS Appl. Energy Mater.* 2020, 3, 1, 1119-1127).

Alternatively, two catalysts (a Fe-based catalyst and a Co-based catalyst) can be used as described in US 2021/0261479 where both catalysts are arranged inside the same reactor. Hydrogen is fed into the reactor, and the carbon dioxide contacts the hydrogen and the catalysts in the reactor to first form carbon monoxide. The so generated carbon monoxide further reacts with hydrogen to form hydrocarbons. In further contemplated methods, carbon dioxide is reduced to methane in the gas phase using a catalyst based on a combination of ceria and nickel, wherein the catalyst is activated by a dielectric barrier discharge plasma as shown in EP 3,050,865.

In still further contemplated methods that do not require traditional catalysts, carbon dioxide can also be reduced by exposing the carbon dioxide to a metal-free catalyst, thus converting the carbon dioxide to a reduced product. In some embodiments, the metal-free catalyst includes various nanomaterials, quantum dots, oxides, and combinations thereof. Most typically, the metal-free catalyst may be supported on a substrate to form a complex as taught in WO 2017/197167. Similarly, non-traditional catalysts may also include a silicon wafer upon which nanowires are disposed. In some embodiments, the nanowires may be light-absorbing and may comprise gallium nitride (GaN), and the catalyst may further include a plurality of nanoparticles comprising copper and iron present on the nanowires. The catalyst can further include a film of water disposed over the plurality of nanoparticles present on the nanowires, and the catalyst may use solar energy (e.g., light from the sun) and/or an electrical current to convert carbon dioxide to methane as is described in U.S. Pat. No. 11,136,243 according to the inventor's own work.

Similarly, with respect to ethane production, it is generally contemplated that all known transformations of carbon dioxide to methane are deemed suitable for use herein so long as the carbon dioxide is at least partially provided by the thermal decomposition of the aragonite or other decomposable material. Thus, suitable ethane production schemes may include one or more metal catalysts, and/or an electrochemical catalytic reaction. As will be readily appreciated, such reactions may be performed at elevated temperatures in the gas phase (which may advantageously use heat content of the carbon dioxide from the decomposition reaction) or in water in the liquid phase.

For example, US 2019/0233952 discloses a reactor in which membrane electrode assemblies are configured to allow for distributed pressure along the cathodic side of the membrane electrode assembly. Here, the pressure vessel acts as a cathode chamber, both for the feed of reactant carbon dioxide as well as collection of products.

In another example, as described in U.S. Pat. No. 11,136,243, carbon dioxide is reacted on an electrocatalyst to which a voltage is applied. The reaction for forming ethanol from carbon dioxide is: $2CO_2 + 9 H_2O + 12\ e^- \rightarrow C_2H_5OH + 12\ OH^-$ ($E^0 = 0.084$ V vs. SHE where E is equilibrium potential). Examples of a suitable electrocatalysts are described in U.S. Patent Publication Nos. 2017/0314148 and 2019/0127866, each of which are incorporated herein in their entirety. As will be readily appreciated, the carbon dioxide and electrocatalyst can be contacted by any method known to those in the art. For example, the carbon dioxide gas can be directly flowed across the electrocatalyst, or the carbon dioxide can be dissolved in water and flowed over the electrocatalyst. In still further examples, the electrocatalyst may include carbon nanospikes and copper (Cu) nanoparticles. The copper nanoparticles may be disposed on and/or embedded in the carbon nanospikes, for example, so that the copper nanoparticles and carbon nanospikes are in close proximity to provide intimate contact between the copper surface and the carbon reactive sites. Moreover, the carbon nanospikes may be doped with a dopant selected from the group consisting of nitrogen, boron, phosphorous, copper, and a combination thereof, and further details, compositions, and uses are shown in U.S. Pat. No. 11,136,243. Notably, such methods can produce ethanol with no ethane or ethylene being produced. For example, ethanol can be produced in a yield of at least 60%, at least 65%, at least 70%, at least 75%, or at least 80% relative to the total products produced.

Alternatively, ethanol and/or ethylene may be electrochemically produced from carbon dioxide. Here, the carbon dioxide is contacted with a copper oxide ($Cu_2O$) electrocatalyst and a voltage is applied to the $Cu_2O$ electrocatalyst to form ethanol and ethylene. The reactions for forming ethanol and ethylene from carbon dioxide is $2CO_2 + 9 H_2O + 12\ e^- \rightarrow C_2H_5OH + 12\ OH^-$ and $2CO_2 + 8 H_2O + 12\ e^- \rightarrow C_2H_4 + 12\ OH^-$. As will be readily appreciated, the carbon dioxide and $Cu_2O$ electrocatalyst can be contacted by any method known to those in the art. For example, the carbon dioxide gas can be flowed across the $Cu_2O$ electrocatalyst or the carbon dioxide can be flowed into or bubbled into an aqueous electrolyte, which contacts the $Cu_2O$ electrocatalyst, and/or counter electrode. The electrochemical cell includes a vessel containing the electrolyte and source of carbon dioxide as well as the $Cu_2O$ electrocatalyst (cathode) in a cathode compartment and a counter electrode (anode) in an anode compartment. The counter electrode can be comprised of Pt, Ag, Ag/Cl, or combinations thereof. The vessel can further contain a solid or gel electrolyte membrane disposed between electrocatalyst (cathode) and counter electrode. Any suitable electrolyte may be used, such as, aqueous $KHCO_3$, aqueous $K_2HPO_4$, and a combination thereof. The electrolyte may be present within the cathode compartment and the anode compartment. In some embodiments, the electrolyte may be saturated with carbon dioxide gas prior to the carbon dioxide reduction. The electrochemical cell further include one or more inlets through which carbon dioxide gas flows into the electrolyte present in the anode and cathode compartments at a rate that allows sufficient carbon dioxide transport to the surface of the $Cu_2O$ electrocatalyst. In any embodiment, the carbon dioxide gas may be bubbled into the electrolyte at any suitable rate, for example, about 5 sccm to about 50 sccm, about 10 sccm to about 40 sccm, or about 20 sccm to about 30 sccm. Further details and considerations as described in in U.S. Pat. No. 11,136,243.

In addition to the above processes, it is further contemplated that the carbon dioxide produced by the methods presented herein may also be used to form hydrocarbons other than methane and ethylene, and an exemplary electrocatalytic processes is described in US 2015/0203973. Similarly, WO 2021/216713 teaches Nafion-modified electrodes for the reduction of carbon dioxide to various hydrocarbon products. Depending on the thickness of the Nafion membrane and its admixture with other polymers, $CO_2$ reduction occurs principally at the electrode-polymer interface. Here, a Nafion overlayer of 15 μm on a Cu electrode enables an extraordinarily high yield of methane production (88% Faradaic efficiency) at a low overpotential (540 mV). This process employs a dilute alloy catalyst for the carbon dioxide reduction in which the catalyst has a majority component and at least one minority component. The majority component is present in a concentration of greater than 90 atomic percent of the catalyst. The majority component is copper, and each minority component is selected from the group consisting of a transition metal, a main group metal, a lanthanide, and a semimetal.

Moreover, it should be appreciated that the carbon dioxide can be reduced to carbon monoxide, which is then reacted with hydrogen following a standard Fischer-Tropsch reaction using molybdenum carbide, cobalt, iron, and/or ruthenium catalysts to produce a variety of (typically short chain) hydrocarbons suitable as fuel.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of thermally decomposing a decomposable carbonate-containing material and recycling waste heat from thermal decomposition, comprising:
    directing solar radiation reflected from a plurality of reflective surfaces to a receiver that contains the decomposable carbonate-containing material;
    wherein the step of directing the solar radiation comprises positioning at least some of the reflective surfaces such that the reflected solar radiation preferentially heats (i) a first portion of the decomposable carbonate-containing material in the receiver relative to a second portion of the decomposable carbonate-containing material in the receiver and/or (ii) a heat transfer medium in the receiver;
    wherein at least some of the decomposable carbonate-containing material is heated in the receiver by the reflected solar radiation and/or the heat transfer medium to a temperature at which the decomposable carbonate-containing material releases carbon dioxide gas and forms a decomposed material; and
    wherein the decomposed material and/or the carbon dioxide gas contain the waste heat; and
    recovering the waste heat with a heat exchange circuit;
    wherein the heat exchange circuit recycles the waste heat by:
    a. preheating the decomposable carbonate-containing material prior to thermal decomposition; and/or
    b. applying the waste heat to a chemical reaction in which the carbon dioxide gas is reduced to fuel.

2. The method of claim 1, wherein the step of positioning of the reflective surfaces to preferentially heat the first portion of the decomposable material in the receiver is effected by a controller.

3. The method of claim 2, wherein the controller effects the positioning based on a distribution and/or a type of the decomposable carbonate-containing material in the receiver.

4. The method of claim 2, wherein the controller determines a size of the first portion based on a quantity of the released carbon dioxide.

5. The method of claim 1, wherein the plurality of reflective surfaces are heliostats, and wherein the heliostats heat the decomposable carbonate-containing material in the receiver to a temperature of 500-950° C.

6. The method of claim 1, wherein the receiver is configured as an hourglass shaped receiver, a fluidized bed receiver, or a flatbed receiver.

7. The method of claim 1, wherein the step of directing the solar radiation produces a focal vertex or a focal edge on the receiver.

8. The method of claim 1, wherein the decomposable carbonate-containing material comprises calcium carbonate.

9. The method of claim 8, wherein the decomposable carbonate-containing material comprises oolitic aragonite.

10. The method of claim 9, wherein the oolitic aragonite has an average particle size of between 1-100 μm.

11. The method of claim 1, wherein the heat exchange circuit further exchanger receives waste heat from a process that is co-located with a plant.

12. The method of claim 11, wherein the waste heat is waste heat from a combustion process, waste heat from power generation, waste heat from exothermic heat of a chemical reaction or reaction sequence, waste heat from a drying operation, or waste heat from a refining operation.

13. The method of claim 1, wherein the step of preheating the decomposable carbonate-containing material uses thermal energy extracted from decomposed material and/or the carbon dioxide gas.

14. The method of claim 1, further comprising a step of feeding the carbon dioxide gas into a reactor and reacting the carbon dioxide in the reactor to produce a fuel.

15. The method of claim 14, wherein the reactor further comprises a catalyst that catalyzes a reduction reaction.

16. The method of claim 14, wherein the fuel is methane, ethanol, or a Fischer-Tropsch liquid.

17. A method of producing a fuel from aragonite, comprising:
    thermally decomposing aragonite using solar energy and supplemental heat thereby forming a carbon dioxide gas and a calcium oxide solid; and subjecting the carbon dioxide gas to a catalytic reduction or an electrocatalytic reduction thereby generating hydrogen, methane, ethanol, or a Fischer-Tropsch liquid as the fuel;

wherein the supplemental heat is (a) waste heat from a co-located process, (b) heat from the calcium oxide solid, and/or (c) heat from the carbon dioxide gas; and wherein the supplemental heat is provided by a heat exchanger.

18. The method of claim 17, wherein the supplemental heat is provided by the heat exchanger and wherein the supplemental heat is used to preheat the aragonite.

19. The method of claim 17, wherein the solar heat is provided from a heliostat and/or a molten salt liquid that was previously heated by solar energy.

* * * * *